(12) United States Patent
Hsieh

(10) Patent No.: US 8,395,357 B2
(45) Date of Patent: Mar. 12, 2013

(54) CHARGING SYSTEM AND METHOD FOR MANAGING ELECTRIC QUANTITY OF BATTERY

(75) Inventor: Yueh-Nu Hsieh, Taipei (TW)

(73) Assignee: AUSUSTeK Computer Inc., Taipei (TW)

( * ) Notice: Subject to any disclaimer, the term of this patent is extended or adjusted under 35 U.S.C. 154(b) by 325 days.

(21) Appl. No.: 12/763,214

(22) Filed: Apr. 20, 2010

(65) Prior Publication Data

US 2010/0327812 A1 Dec. 30, 2010

(30) Foreign Application Priority Data

Jun. 26, 2009 (TW) .............................. 98121601 A

(51) Int. Cl.
*H02J 7/00* (2006.01)

(52) U.S. Cl. ....................................... 320/134; 320/150

(58) Field of Classification Search .................... 320/134
See application file for complete search history.

(56) References Cited

U.S. PATENT DOCUMENTS

| | | | |
|---|---|---|---|
| 5,241,259 A | 8/1993 | Patino et al. | |
| 5,904,707 A * | 5/1999 | Ochs et al. | 607/6 |
| 6,326,767 B1 | 12/2001 | Small et al. | |
| 6,489,751 B2 | 12/2002 | Small et al. | |
| 6,925,400 B2 * | 8/2005 | Iwaizono | 702/63 |
| 2007/0273334 A1 * | 11/2007 | Meyer et al. | 320/138 |

FOREIGN PATENT DOCUMENTS

| | | |
|---|---|---|
| CN | 101106283 | 1/2008 |
| CN | 101394103 | 3/2009 |

* cited by examiner

*Primary Examiner* — Arun Williams
(74) *Attorney, Agent, or Firm* — Jianq Chyun IP Office

(57) ABSTRACT

A method for managing electric quantity of a battery is disclosed. The method includes charging a battery normally with a 4.2V voltage when a temperature of the battery is lower than a first threshold temperature; charging the battery continuously when the temperature of the battery is higher than the first threshold temperature and lower than a second threshold temperature and the electric quantity of the battery is lower than a first threshold voltage. On the contrary, the battery is not charged any more when the temperature of the battery is between the first threshold temperature and the second threshold temperature and the electric quantity of the battery is higher than the first threshold voltage or a first capacity. If the temperature of the battery is higher than a second threshold temperature, the battery is not charged any more regardless of the battery voltage.

23 Claims, 3 Drawing Sheets

CHARGING SYSTEM AND METHOD FOR MANAGING ELECTRIC QUANTITY OF BATTERY

CROSS-REFERENCE TO RELATED APPLICATION

This application claims the priority benefit of Taiwan application serial no. 98121601, filed on Jun. 26, 2009. The entirety of the above-mentioned patent application is hereby incorporated by reference herein and made a part of specification.

BACKGROUND OF THE INVENTION

1. Field of the Invention

The invention relates to a method for charging a battery and, more particularly, to a technique for charging a battery at a high temperature.

2. Description of the Related Art

A typical battery charger includes three control circuits, a constant current control circuit, a constant voltage control circuit, and a constant temperature control circuit. When a battery with less electric quantity is charged, the battery charger enters a constant current mode. At that moment, the constant current control circuit may keep a stable charging current to charge the battery. Generally, the temperature of a conventional charger is between 0 degree centigrade (° C.) and 45° C., and the conventional charger may charge the battery continuously in the constant current mode as long as the voltage of the battery is less than 4.2 volts (V). When the voltage of the battery reaches 4.2 V, the charger switches to a constant voltage mode. At that moment, the current becomes less and less gradually until the battery is fully charged.

When the voltage of the battery reaches a preset voltage which is usually 4.2V, the conventional charger enters the constant voltage mode. At that moment, the constant voltage control circuit in the conventional charger may charge the battery with a constant voltage. When the constant temperature control circuit detects that the temperature of the battery is higher than 45° C., to avoid the expansion and liquid leakage caused by charging the battery at 4.2V voltage and high temperature, even the voltage of the battery does not reach 4.2V, the conventional charger stops charging the battery immediately when the preset temperature such as 45° C. is reached. However, a battery cell may be charged with a small constant voltage such as 4.1V at the temperature between 45° C. and 60° C. The conventional charger cannot switch the charging voltage according to the temperature change. Therefore, when the temperature is between 45° C. and 60° C., even if the voltage is low, the battery cannot be charged. Therefore, conventionally, when the temperature is higher than 45° C., the battery cannot be charged, and the battery is charged when the temperature is lower than 45° C.

BRIEF SUMMARY OF THE INVENTION

The invention discloses a charging system which may charge a battery in a wider temperature range. The battery may achieve high voltage in the charge process at high temperature without changing hardware or a charging chip greatly.

The invention discloses a method for managing electric quantity of a battery, which may charge a battery normally in different temperatures and avoid problems such as the expansion of a battery cell.

The invention discloses a charging system which may charge a battery in a wider range. The invention includes a charger and a detecting unit. The detecting unit may measure a plurality of electrical parameters of the battery. When the temperature of the battery is lower than a first threshold temperature, the charger may charge the battery normally. When the temperature of the battery is higher than the first threshold temperature but lower than a second threshold temperature, the detecting unit may determine whether the electric quantity of the battery is lower than a first threshold voltage. If the temperature of the battery is between the first threshold temperature and the second threshold temperature, and the electric quantity of the battery is lower than the first threshold temperature, the charger charges the battery continuously. On the contrary, when the temperature of the battery is between the first threshold temperature and the second threshold temperature, and the electric quantity of the battery is higher than the first threshold voltage, the detecting unit makes the charger stop charging the battery any more. When the temperature of the battery is higher than a second threshold temperature, besides the charging chip, the detecting system also may be used for stopping charging the battery.

In an embodiment of the invention, the battery may be coupled to an electronic device during charging. Therefore, when the detecting unit determines that the temperature of the battery is larger than the second threshold temperature and the electric quantity is larger than a second threshold voltage, if the battery is coupled to an electronic device, the detecting unit may start the electronic device to discharge the battery to power the electronic device. The second threshold voltage is lower than the first threshold voltage.

In another aspect, the invention also discloses a method for managing the electric quantity of a battery. The method including the following steps. First, when the temperature of the battery is lower than a first threshold temperature, a battery is charged normally. Second, when the temperature of the battery is higher than the first threshold temperature and is lower than a second threshold temperature, and the electric quantity of the battery is lower than a first threshold voltage, the battery is charged continuously. On the contrary, when the temperature of the battery is between the first threshold temperature and the second threshold temperature, and the electric quantity of the battery is higher than the first threshold voltage, the battery is not charged any more.

In addition, if the temperature of the battery is higher than the second threshold temperature, the battery is also not charged any more.

In the invention, the battery may be charged continuously without changing hardware or charging chip greatly when the temperature of the battery is between the first threshold temperature and the second threshold temperature, and the electric quantity of the battery is lower than a first threshold voltage. Therefore, the battery may be charged in a wider temperature range, and the expansion of the battery is usually avoided when the battery is charged at a high temperature and a high voltage.

These and other features, aspects and advantages of the present invention will become better understood with regard to the following description, appended claims, and accompanying drawings.

DETAILED DESCRIPTION OF THE EMBODIMENTS

Figure 1:
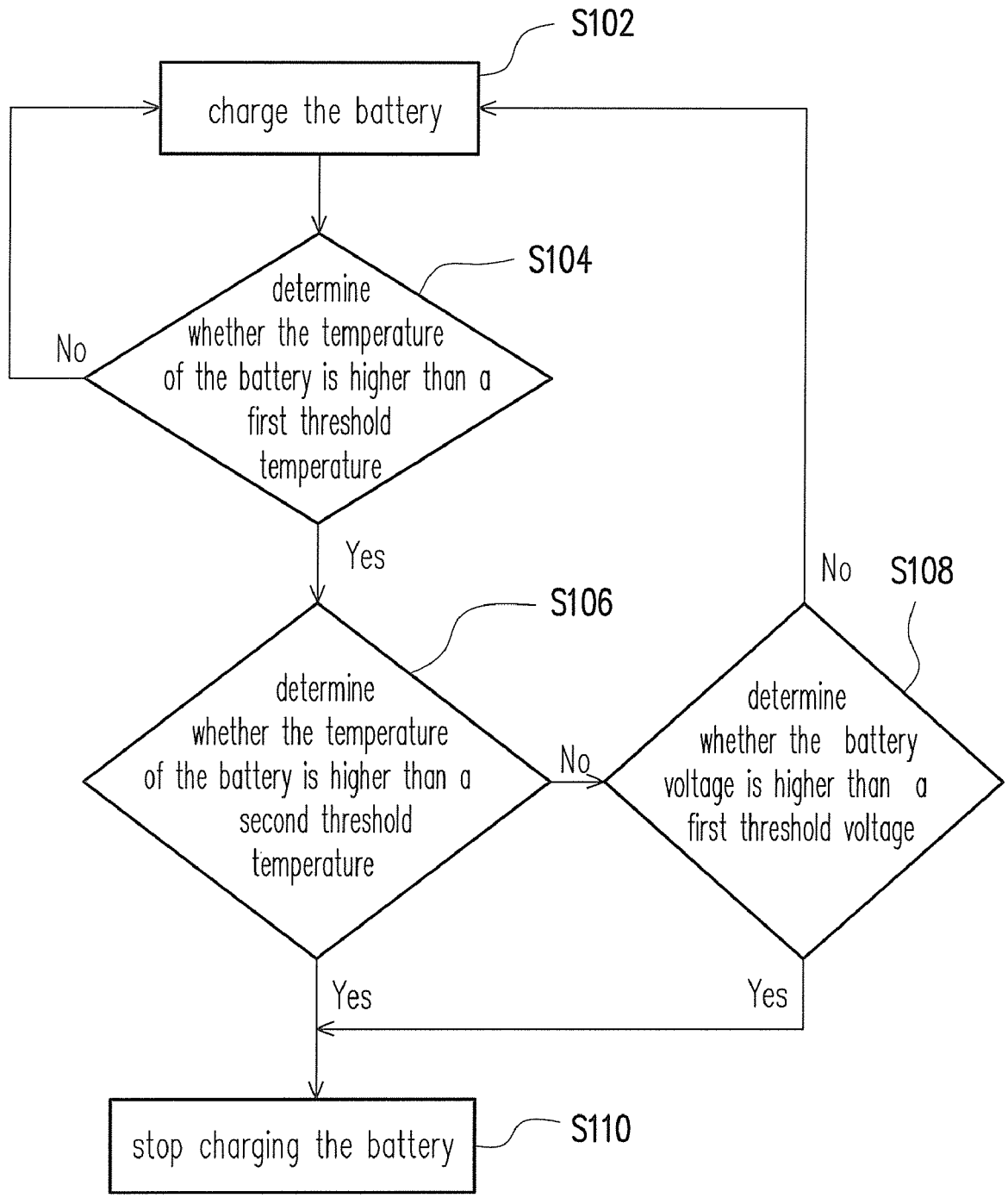
FIG. 1 is a flow chart showing a method for managing an electric quantity of a battery in an embodiment of the invention.

FIG. 1 is a flow chart showing a method for managing an electric quantity of a battery in an embodiment of the invention. As shown in FIG. 1, the battery adapted to the managing method disclosed in the embodiment may be a lithium battery. When the battery is charged, step S102 is performed and then step S104 is performed to determine whether the temperature of the battery is higher than a first threshold temperature. In the embodiment, the first threshold temperature is preferably 45° C., but it is not limited thereto.

If the temperature of the battery does not exceed the first threshold temperature ("no" denoted in step S104), step S102 is continuously performed to charge the battery normally. However, if the temperature of the battery exceeds the first threshold temperature ("yes" denoted in step S104), step S106 is further performed to determine whether the temperature of the battery is higher than a second threshold temperature. The second threshold temperature is preferably 60° C., but it is not limited thereto.

If the temperature of the battery is higher than the first threshold temperature but lower than the second threshold temperature ("no" denoted in step S106), step S108 is selectively performed, and that is, whether the electric quantity (voltage values) of the battery exceeds a first threshold voltage is further determined. In the embodiment, the first threshold voltage may be higher than 3.1V but lower than 4.2V, and for example, it may be 4.1V.

In step S108, if the temperature of the battery is determined between first threshold temperature and the second threshold temperature, and the electric quantity (voltage values) of the battery does not exceed the first threshold voltage ("no" denoted in step S108), the method goes back to step S102 to charge the battery continuously.

In step S106, if the temperature of the battery exceeds the second threshold temperature ("yes" denoted in step S106), as shown in step S110 in the embodiment, the battery is not charged any more. Correspondingly, even if the temperature of the battery does not exceed the second threshold temperature, and that is, the temperature is between the first threshold temperature and the second threshold temperature, if the electric quantity (voltage values) of the battery exceeds the first threshold voltage ("yes" denoted in step S108), as in step S110 in the embodiment, the battery is not charged any more to avoid possible problems such as the battery expansion.

Figure 2:
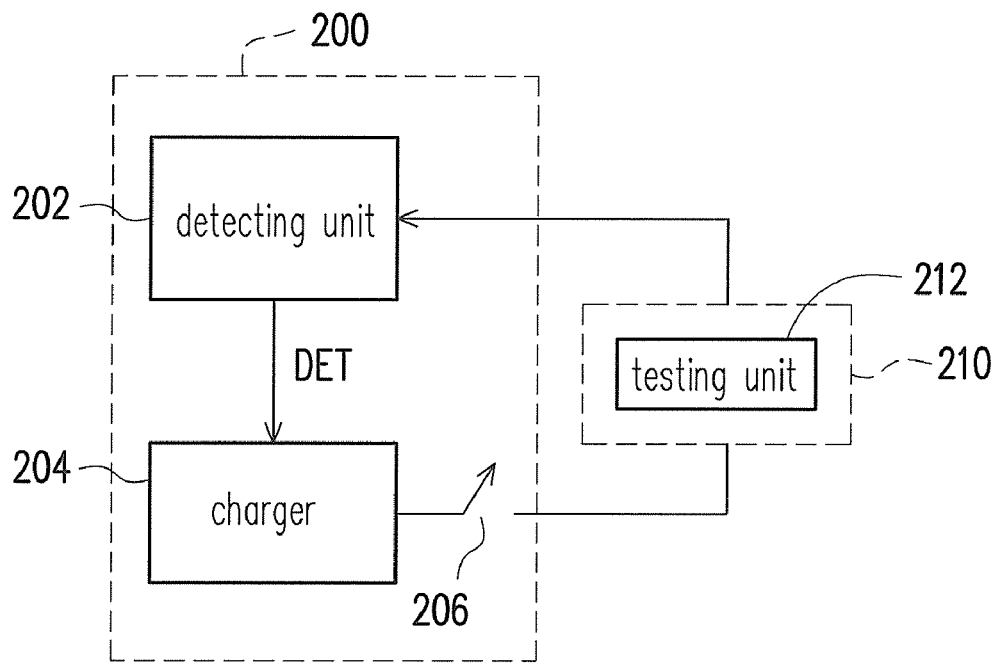
FIG. 2 is a block diagram showing a charging system in an embodiment of the invention.

FIG. 2 is a block diagram showing a charging system in the embodiment of the invention. As shown in FIG. 2, a charging system 200 in the embodiment may charge a battery 210 (a lithium battery). The charging system 200 includes a detecting unit 202 and a charger 204. The detecting unit 202 is coupled to the charger 204. The detecting unit 202 may be realized by software in some embodiment or a microprocessor, in some other embodiments, and it is not limited in the invention.

In the embodiment, the charging system 200 also includes a switch unit 206 coupled to an end of the charger 204 and an end of the battery 210. When the battery 210 is disposed in the charging system 200 to be charged, the charger 204 may control the switch unit 206 to be on or off. Then, the charger 204 determines whether the voltage at an output end reaches a preset voltage (and a detecting result DET is also outputted to the charger 204). Generally, the preset voltage is, for example, 4.2V. If the voltage at the outputted end of the charger 204 does not reach the preset voltage, a constant current is provided to charge the battery 210, and the constant current may be 500 mill amperes (mA).

Correspondingly, if the voltage outputted by the charger 204 reaches the preset voltage, the charger 204 provides a constant voltage source to the battery 210. In the embodiment, the potential of the voltage source may be the same as the preset voltage, and they are both 4.2 V. However, it is also not limited in the invention.

In the embodiment, the battery 210 may have a testing unit 212. The detecting unit 202 may obtain a plurality of instant electrical parameters of the battery 210 via the testing unit 212. The electrical parameters include a temperature of the battery, a voltage, a current and so on. When the detecting unit 202 obtains the instant electrical parameters of the battery 210, the electrical parameters may be taken as a detecting result DET to be sent to the charger 204. As shown in FIG. 1, when the temperature of the battery exceeds a first threshold temperature (such as 45° C.), the detecting unit 202 may determine whether the electric quantity (voltage values) of the battery 210 exceeds the first threshold voltage (such as 4.1 V).

At that moment, if the temperature of the battery 210 exceeds the first threshold temperature, but the stored electric quantity (voltage values) does not exceed the first threshold voltage, the charger 204 charges the battery 210 continuously. Correspondingly, if the temperature of the battery 210 exceeds the first threshold temperature, and the electric quantity stored in the battery 210 exceeds the first threshold voltage, the charger 204 may open the switch unit 206 according to the detecting result DET to stop charging the battery 210. In addition, if the temperature of the battery 210 increases continuously and exceeds the second threshold temperature (such as 60° C.), the charger 204 also may open the switch unit 206 according to the detecting result DET to stop charging the battery 210. In some other embodiments, the charging system 200 also may turn off the switch unit 206 to stop charging the battery.

In FIG. 2, the testing unit 212 is disposed in the battery 210. In other embodiments, the testing unit 212 also may be disposed in the charger 204 or separately disposed in the electronic device, and it is not limited in the invention.

Figure 3:
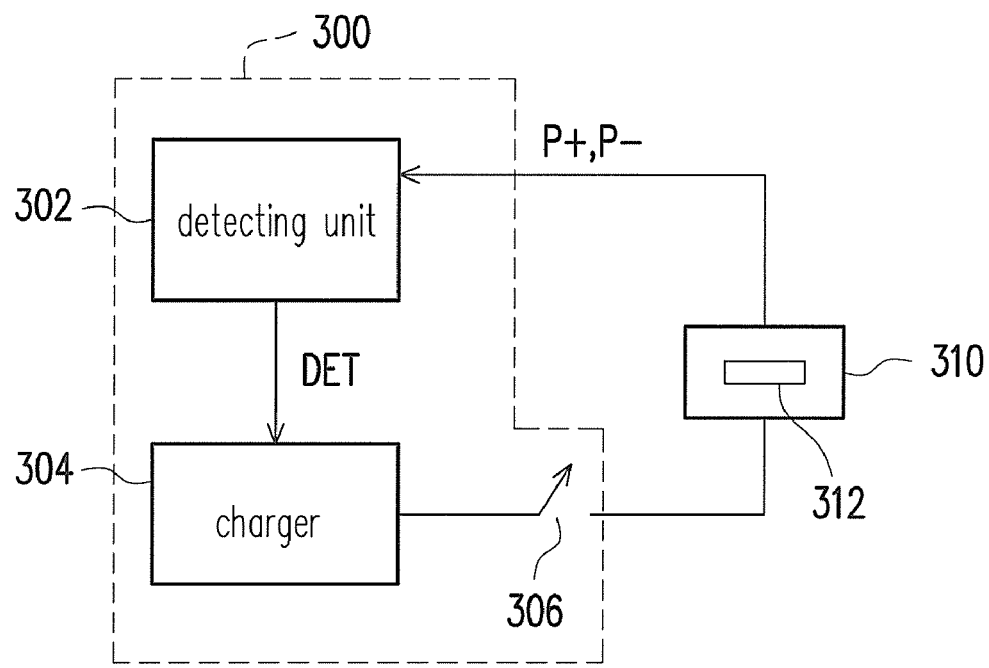
FIG. 3 is a block diagram showing a charging system in another embodiment of the invention.

FIG. 3 is a block diagram showing a charging system in another embodiment of the invention. As shown in FIG. 3, a charging system 300 in the embodiment also may charge a battery 310 (lithium battery). The charging system 300 also includes a detecting unit 302, a charger 304, and a switch unit 306. The detecting unit 302 may be coupled to a positive pole and a negative pole of the battery 310, and it also may be coupled to the charger 304. In addition, the charger 304 may be coupled to the battery 310 via the switch unit 306.

The battery 310 in the embodiment does not have the testing unit 212 in FIG. 2. Therefore, the detecting unit 302 needs to detect the electric quantity (voltage values) of the battery 310 by measuring the voltage difference between the positive pole and negative pole of the battery 310. In addition, the battery 310 also may include a thermal sensing unit 312 such as a thermal resistor. The electrical characteristic of the thermal sensing unit 312, such as the resistance value, may change along with an environment temperature. Therefore, the charger 304 may determine the temperature of the battery 310 according to the electrical characteristic of the thermal sensing unit 312. In the embodiment, other operating modes are the same as those in FIG. 2, and they are not illustrated herein for a concise purpose.

Figure 4:
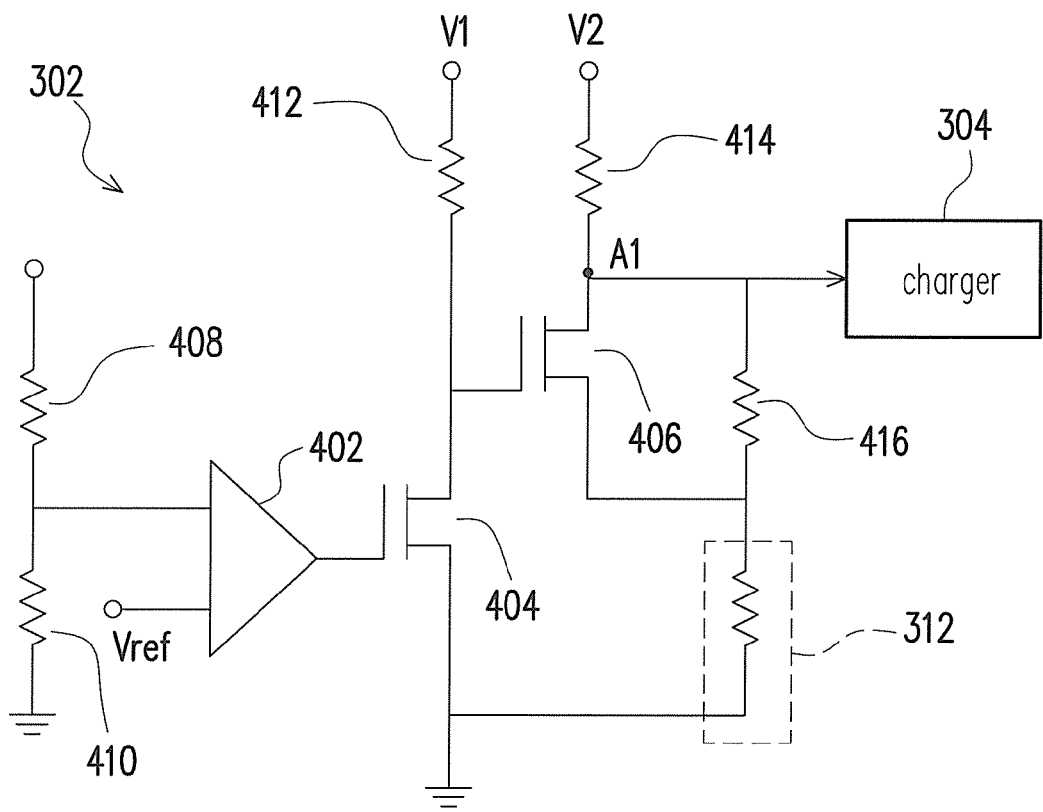
FIG. 4 is a circuit diagram showing the detecting unit in FIG. 3 in an embodiment of the invention.

FIG. 4 is a circuit diagram showing the detecting unit in FIG. 3 in an embodiment of the invention. As shown in FIG. 4, the detecting unit 302 includes a comparator 402, transistors 404 and 406, and resistors 408, 410, 412, 414 and 416. A first input end of the comparator 402 may receive an output voltage Vbat of the battery 310 namely the voltage difference between the positive pole and negative pole of the battery 310 via the resistor 408. In addition, the first input end of the comparator 402 also may be connected to the ground via the resistor 410. The second input end of the comparator 402 may be coupled to a reference voltage Vref. The output end of the comparator 402 is coupled to the gate of the transistor 404, a first source end and the first drain end of the transistor 404 is coupled to a first voltage bias V1 via the resistor 412, and a second source end and the second drain end is connected to the ground. In addition, the gate of the transistor 406 is coupled to the first source end and the first drain end of the transistor 404, and the first source end and the first drain end of the transistor 406 is coupled to a second voltage bias V2 via the resistor 414. The second source end and the second drain end of the transistor 406 may be connected to the ground via the thermal sensing unit 312 and coupled to the first source end the first drain end of the transistor 406 to form a node A1 via the resistor 416. Then, the node A1 is coupled to a connecting port of the charger 304 which is used to receive the detecting result DET. In the embodiment, both the transistors 404 and 406 may be N-mental-oxide-semiconductor (NMOS) transistors.

As shown in FIG. 4, the first input end of the comparator 402 receives a partial voltage of the output voltage Vbat of the battery 310. When the voltage of the battery Vbat exceeds the first threshold voltage, the output end of the comparator 402 has high potential to make the transistor 404 conducted to pull down the potential of the gate of the transistor 406 to the grounding potential. Therefore, the transistor 406 is in an off state, and the potential VA1 of the node A1 may be represented as below:

$$V_{A1} = V1 \times \frac{R2 + R3}{R1 + R2 + R3} \quad (1)$$

R1, R2 and R3 are the resistances of resistors 414 and 416, and the thermal sensing unit 312, respectively. The resistance of the thermal sensing unit 312 may change along with the temperature change.

In addition, when the voltage of the battery Vbat does not exceed the first threshold voltage, the output end of the comparator 402 has low potential. Therefore, the transistor 404 is off, and the potential of the gate of the transistor 406 is pulled up to V1 to make the transistor 406 on. In other words, the resistor 416 may be considered as a short circuit. Therefore, the potential $V_{A1}$ of the node A1 is represented as below:

$$V_{A1} = V1 \times \frac{R3}{R1 + R3} \quad (2)$$

As shown in formulas (1) and (2), in the same temperature, and that is, the thermal sensing unit 312 has the same resistance value, the potential of the node A1 when the voltage of the battery Vbat exceeds the first threshold voltage may exceeds the potential of the node A1 when the voltage of the battery Vbat is lower than the first threshold voltage. In other words, when the voltage of the battery is lower than the first threshold voltage, a cut off charging temperature set by the charger 304 is higher, which may be 60° C. When the voltage of the battery exceeds the first threshold voltage, the charger 304 may reduce the cut off charging temperature to a temperature such as 45° C. by changing the resistance or the partial voltage via the above circuit. For example, when the voltage of the battery Vbat exceeds the first threshold voltage, the charger 304 allows the temperature of the battery 310 to be low. For example, when the voltage of the battery Vbat exceeds 4.1V, and the temperature of the battery 310 is higher than 45° C. (but lower than 60° C.), the charger 304 may open the switching unit 306 to stop charging the battery 310. On the contrary, when the voltage of the battery Vbat is lower than 4.1V, even the temperature of the battery 310 is between 45° C. to 60° C., the charger 304 also may conduct the switching unit 306 to charge the battery 310 continuously.

Figure 5:
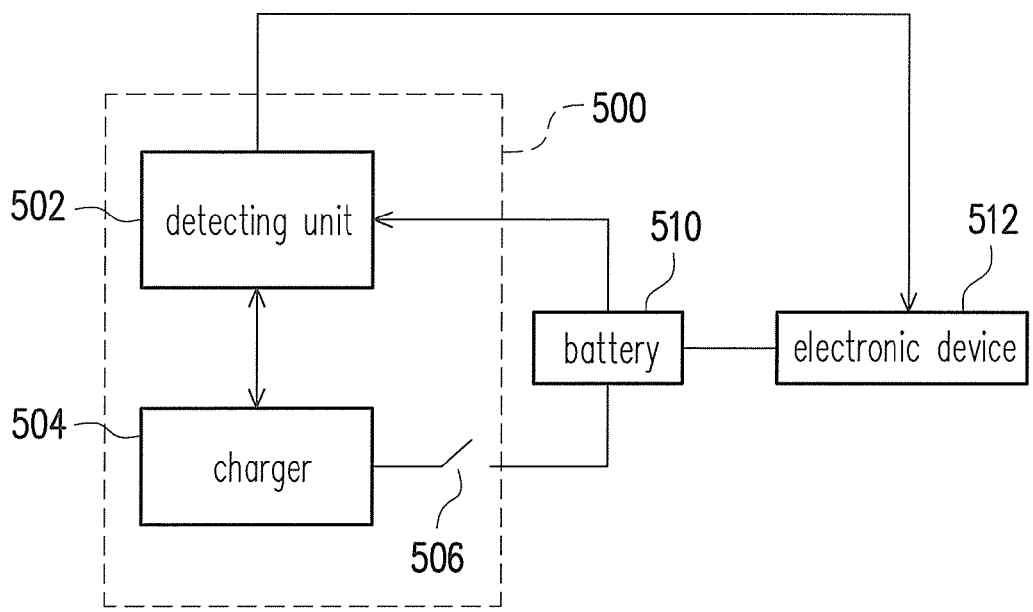
FIG. 5 is a circuit diagram showing that the battery is coupled to an electronic device during a charging process in an embodiment of the invention.

FIG. 5 is a circuit diagram showing that the battery is coupled to an electronic device during a charging process in an embodiment of the invention. As shown in FIG. 5, the charging system 500 in the embodiment also includes a detecting unit 502, a charger 504, and a switch unit 506. The coupling modes of the three components are the same as those in the above two embodiments, and they are not illustrated herein for a concise purpose. In some cases, the battery 510 is still coupled to an electronic device while it is charged. In those cases, the charger may be a simplified charger (a travel charger or a vehicle charger) directly charging the battery of the electronic device (such as a portable phone).

As shown in FIG. 5, in the embodiment, when the temperature of the battery 510 exceeds the second threshold temperature, the charger 504 opens the switch unit 506. In other embodiments, the detecting unit 502 further may determine whether the electric quantity (voltage values) of the battery 510 exceeds a second threshold voltage. The second threshold voltage is lower than the first threshold voltage, and it may be 3.8V.

If the temperature of the battery 510 exceeds the second threshold temperature, but the electric quantity (voltage values) of the battery 510 does not exceed the second threshold voltage, the charger 504 only opens the switch unit 506. On the contrary, if the temperature of the battery 510 exceeds the second threshold temperature, and the electric quantity (voltage values) of the battery 510 exceeds the second threshold voltage, the charger 504 opens the switch unit 506, and the detecting unit 502 also may start the electronic device 512 to discharge the battery to power the electronic device 512. Therefore, in the embodiment, the battery expansion due to overlarge electric quantity (voltage values) in an over high temperature environment is avoided. The discharge function is also usable without the travel charger or the vehicle charger. In addition, the charging system 500 may be disposed in the electronic device 512.

To sum up, in the charging process, if the temperature of the battery is determined to be between the first threshold temperature and the second threshold temperature, but the electric quantity (voltage values) of the battery does not exceed the first threshold voltage, the battery is charged continuously. Therefore, the invention may allow the battery to be charged in a wider temperature range.

In addition, in the charging process, if the temperature of the battery is determined to be between the first threshold temperature and the second threshold temperature, but the electric quantity (voltage values) of the battery exceeds the first threshold voltage, or the temperature of the battery exceeds the second threshold temperature, the battery is not charged any more. Therefore, the battery may be protected to avoid the expansion due to high temperature when the battery is charged.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A charging system adapted to charge a battery, the charging system comprising:
    a charger coupled to the battery to charge the battery; and
    a detecting unit coupled to the charger and the battery to measure a plurality of electrical parameters of the battery;
    wherein when the temperature of the battery is lower than a first threshold temperature, the charger charges the battery normally,
    when the temperature of the battery is higher than the first threshold temperature but lower than a second threshold temperature, the detecting unit determines whether electric quantity of the battery is lower than a first threshold voltage,
    when the temperature of the battery is between the first threshold temperature and the second threshold temperature, and the electric quantity of the battery is lower than the first threshold voltage, the charger charges the battery continuously;
    when the battery is coupled to an electronic device, the temperature of the battery is higher than the second threshold temperature, the electric quantity of the battery is higher than a second threshold voltage, the detecting unit starts the electronic device and discharges the battery to power the electronic device, and the second threshold voltage is lower than the first threshold voltage; and
    when the temperature of the battery is between the first threshold temperature and the second threshold temperature, and the electric quantity (voltage values) of the battery is higher than the first threshold voltage, the charger stops charging the battery.

2. The charging system according to claim 1, wherein when the temperature of the battery is higher than the second threshold temperature, the charger stops charging the battery.

3. The charging system according to claim 1, wherein the battery has a testing unit and the detecting unit obtains the electrical parameters of the battery via the testing unit.

4. The charging system according to claim 3, wherein the detecting unit obtains instant electric quantity and temperature of the battery via the testing unit.

5. The charging system according to claim 1, wherein the detecting unit obtains the electric quantity of the battery by measuring a voltage difference between a positive pole and a negative pole of the battery.

6. The charging system according to claim 1, wherein the battery has a thermal sensing unit and the detecting unit determines the temperature of the battery according to a resistance of the thermal sensing unit.

7. The charging system according to claim 1, wherein the second threshold voltage is higher than 3.1 volts (V) and lower than 4.1V.

8. The charging system according to claim 1, wherein the second threshold voltage is 3.8V.

9. The charging system according to claim 1, wherein the first threshold voltage is higher than 3.1V and lower than 4.2V.

10. The charging system according to claim 9, wherein the first threshold voltage is 4.1V.

11. The charging system according to claim 1, wherein the first threshold temperature is 45 degree centigrade (° C.).

12. The charging system according to claim 1, wherein the second threshold temperature is 60° C.

13. A method for managing electric quantity of a battery, comprising the steps of:
    measuring the electric quantity and temperature of the battery;
    charging the battery normally when the temperature of the battery is lower than a first threshold temperature;
    charging the battery continuously when the temperature of the battery is higher than the first threshold temperature but lower than a second threshold temperature and the electric quantity of the battery is lower than a first threshold voltage;
    starting an electronic device and discharging the battery to power the electronic device when the battery is coupled to the electronic device, wherein the temperature of the battery is higher than the second threshold temperature, the electric quantity is higher than a second threshold voltage, and the second threshold voltage is lower than the first threshold voltage; and
    stopping charging the battery when the temperature of the battery is between the first threshold temperature and the second threshold temperature, and the electric quantity of the battery is higher than the first threshold voltage.

14. The method for managing the electric quantity according to claim 13, wherein when the temperature of the battery is higher than the second threshold temperature, the battery is not charged any more.

15. The method for managing the electric quantity according to claim 13, wherein the step of measuring the electric quantity and temperature of the battery comprises obtaining a plurality of electrical parameters of the battery.

16. The method for managing the electric quantity according to claim 13, wherein the step of measuring the electric quantity and the temperature of the battery comprises measuring a voltage difference between a positive pole and a negative pole of the battery to obtain the electric quantity of the battery.

17. The method for managing the electric quantity according to claim 13, wherein the step of measuring the temperature of the battery comprises measuring an environment temperature of the battery to obtain the temperature of the battery.

18. The method for managing the electric quantity according to claim 13, wherein the second threshold voltage is higher than 3.1V and is lower than 4.1V.

19. The method for managing the electric quantity according to claim 13, wherein the second threshold voltage is 3.8V.

20. The method for managing the electric quantity according to claim 13, wherein the first threshold voltage is higher than 3.1V and is lower than 4.2V.

21. The method for managing the electric quantity according to claim 20, wherein the first threshold voltage is 4.1 V.

22. The method for managing the electric quantity according to claim 13, wherein the first threshold temperature is 45° C.

23. The method for managing the electric quantity according to claim 13, wherein the second threshold temperature is 60° C.

* * * * *